US006975923B2

(12) United States Patent
Spriggs

(10) Patent No.: US 6,975,923 B2
(45) Date of Patent: Dec. 13, 2005

(54) AUTONOMOUS VEHICLE GUIDANCE ON OR NEAR AIRPORTS

(75) Inventor: Timothy John Spriggs, Hayling Island (GB)

(73) Assignee: Roke Manor Research Limited, Romsey (GB)

( * ) Notice: Subject to any disclaimer, the term of this patent is extended or adjusted under 35 U.S.C. 154(b) by 240 days.

(21) Appl. No.: 10/674,066

(22) Filed: Sep. 30, 2003

(65) Prior Publication Data

US 2004/0133341 A1 Jul. 8, 2004

(30) Foreign Application Priority Data

Oct. 1, 2002 (GB) .................................... 0222692
Dec. 5, 2002 (GB) .................................... 0228348

(51) Int. Cl.[7] .............................................. G06F 19/00
(52) U.S. Cl. ...................... 700/245; 700/246; 700/250; 700/251; 700/254; 700/257; 700/626; 700/302; 701/200; 701/301; 701/208; 701/210; 701/213; 701/117; 701/45; 342/357.06; 342/357.13; 342/386; 342/357.08; 340/436
(58) Field of Search ................................ 700/245, 246, 700/250, 251, 254, 257, 262, 302; 701/45, 701/200, 210, 213, 208, 301; 342/386, 357.06, 342/357.08, 357.13; 340/436

(56) References Cited

U.S. PATENT DOCUMENTS 5,597,335 A * 1/1997 Woodland .................... 441/36
5,983,161 A * 11/1999 Lemelson et al. .......... 701/301
6,275,773 B1 * 8/2001 Lemelson et al. .......... 340/436
6,405,132 B1 * 6/2002 Breed et al. ................ 701/301
6,411,890 B1 * 6/2002 Zimmerman ................ 348/116
6,487,500 B2 * 11/2002 Lemelson et al. .......... 701/301
6,739,556 B1 * 5/2004 Langston .................... 244/189
6,868,314 B1 * 3/2005 Frink ............................ 701/3
2003/0093187 A1 * 5/2003 Walker .......................... 701/1
2004/0059497 A1 * 3/2004 Sankrithi ..................... 342/34
2004/0078122 A1 * 4/2004 Pippenger ...................... 701/3
2005/0046569 A1 * 3/2005 Spriggs et al. .............. 340/551

FOREIGN PATENT DOCUMENTS

FR 2 675 919 4/1991

* cited by examiner

*Primary Examiner*—Thomas G. Black
*Assistant Examiner*—McDieunel Marc
(74) *Attorney, Agent, or Firm*—Crowell & Moring LLP

(57) ABSTRACT

A method for operating an autonomous vehicle at an airport comprises the steps of: receiving a set of general purpose navigation signals; receiving a supplementary set of navigation signals; receiving constraint data representing a permitted area of operation; calculating a present position of the vehicle; comparing the calculated present position of the vehicle with the constraint data, thereby to determine whether the vehicle's present position lies within the permitted area; and producing a signal indicative of the result of said comparing step. The autonomous vehicle for use at an airport, comprising: a navigation processor for calculating a present position of the vehicle; a constraint store for storing constraint data indicating a permitted area of operation; navigation receivers for receiving general purpose navigation signals and supplementary navigation signals, for guiding aircraft to land at the airport; and a comparator for comparing the constraint data with the present position.

14 Claims, 3 Drawing Sheets

AUTONOMOUS VEHICLE GUIDANCE ON OR NEAR AIRPORTS

The present invention relates to the control of autonomous vehicles for airside use at airports.

Numerous autonomous vehicles could be usefully employed on the airside of airports. For example, vehicles such as described in copending patent applications GB0127904.1 and PCT/GB02/005258 may be used for the detection and possibly also the removal of debris from taxiways and runways at airports. Autonomous grass cutting vehicles could also be of use, as could automated vehicles for carrying supplies or passengers' baggage to or from aircraft.

Numerous safety regulations govern and restrict the use of airside autonomous vehicles. These regulations are intended to protect the safety of the aircraft and all persons associated with the airport.

Known systems such as the Global Positioning System (GPS), which provides a satellite navigation service, could be used to control or at least monitor the progress of autonomous vehicles. However, in order for such vehicles to be allowed by the safety regulations, they would need to be physically constrained from entering onto active areas such as runways, by the use of physical barriers, such as rails or fences. However, structures such as fences are forbidden from the side of the runway by the safety regulations.

A problem accordingly exists in defining a system for the control and operation of autonomous vehicles for airside use which do not require the use of physical barriers, yet are permitted to operate in the vicinity of active areas such as runways.

According to the present invention, this problem is addressed by the provision of a method for operating an autonomous vehicle at an airport. The method comprising the steps of: (a) providing a first set of navigation signals for general purpose use; (b) providing a second set of navigation signals, being supplementary to the first navigation signals, for guiding aircraft to land at the airport; (c) receiving, in the vehicle, the first set of navigation signals; (d) receiving, in the vehicle, the second set of navigation signals; (e) receiving constraint data representing a permitted area of operation; (f) calculating a present position of the vehicle; (g) comparing the calculated present position of the vehicle with the constraint data, thereby to determine whether the vehicle's present position lies within the permitted area; and (h) producing a signal indicative of the result of said comparing step; and (i) operating the vehicle in accordance with a predefined strategy in response to the status of the signal of step (h). Steps (f), (g) and (h) may also be performed within the vehicle.

The first set of navigation signals preferably comprises signals emitted by a satellite navigation system.

The second set of navigation signals preferably comprises signals emitted by an augmentation system for navigation for commercial air transport. The second set of navigation signals may comprise signals sent by a ground-based augmentation system (GBAS). The second set of navigation signals may comprise a set of signals issued at a fixed period, and wherein the vehicle monitors the arrival of these periodic signals and emits an alarm signal if the periodic signal is not received within a predetermined delay. Preferably, the vehicle proceeds to a predetermined muster station, in response to the alarm signal. This muster station may be defined as the current location of the vehicle when the navigation service fails.

An alarm may be generated to an operator, in response to the comparing step indicating that the vehicle lies outside of the permitted area. The operator may then be enabled to remotely control the vehicle, thereby moving the vehicle into its permitted area.

The method may include, in response to the comparing step indicating that the vehicle lies outside of the permitted area, automatically calculating a route from the vehicle's present position to the permitted area; and controlling the vehicle to proceed to the permitted area.

The method may include, in response to the comparing step indicating that the vehicle lies outside of the permitted area, controlling the vehicle to proceed to a predetermined muster station.

The method may include issuing a muster signal to the vehicle, receiving said muster signal in the vehicle, and controlling the vehicle to proceed to a muster station. The muster signal may comprise a signal redefining the permitted area to include only the muster station.

The present invention also provides an autonomous vehicle for use at an airport, comprising: electrical and mechanical subsystems to enable the vehicle to move and to perform an allotted function; a traction control subsystem for controlling the electrical and mechanical subsystems to operate the vehicle in a required manner; a path management system for calculating a required path for the motion of the vehicle to follow; a navigation processor for calculating a present position of the vehicle; a constraint store for storing constraint data indicating a permitted area of operation; a comparator for comparing the constraint data with the present position; a first navigation receiver for receiving a first set of navigation signals, being general purpose navigation signals; an operator interface for communicating with an operator; and a second navigation receiver for receiving a second set of navigation signals, being supplementary to the first navigation signals, for guiding aircraft to land at the airport.

The above, and further, objects, characteristics and advantages of the present invention will become more apparent with reference to the following description of certain embodiments, in conjunction with the accompanying drawings in which.

The present invention accordingly makes use of existing types of airport infrastructure, which are inherently approved by the authorities responsible for the airport in question.

The concept of Satellite Navigation using, for example, GPS, is well known. The integrity and continuity of service performance of these systems is presently insufficient for certain applications, particularly for commercial air traffic during landing operations.

Figure 1:
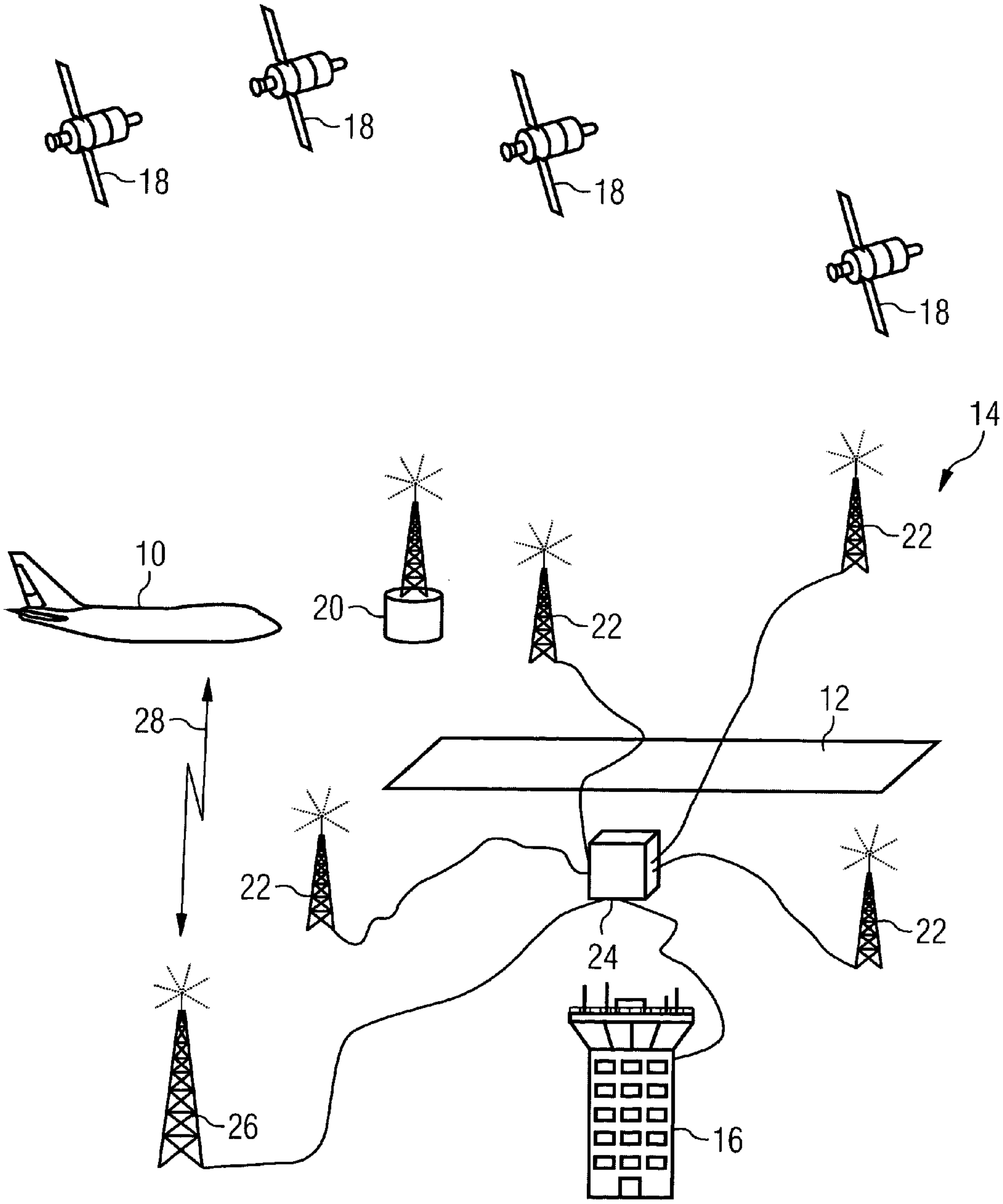
FIG 1 Prior Art
FIG. 1 shows a typical navigation system for use at an airport, providing location information which is sufficiently accurate and reliable to be an aid to aircraft landing.

Augmentation systems have been developed to further enable the use of satellite navigation for commercial air transport. The main systems currently in development are satellite based augmentation systems such as EGNOS (the European Geo-stationary Navigation Overlay Service), MSAS (MTSAT Satellite-based Augmentation System) and the WAAS (Wide Area Augmentation Service). These systems depend on additional geo-stationary satellites to transmit integrity, correction and status data. Air and ground-based augmentation systems (ABAS & GBAS) have also been developed. FIG. 1 shows an example of a ground based augmentation system (GBAS).

FIG. 1 shows an aircraft 10 coming in to land on a runway 12 of an airport 14. Control tower 16 contains air- and ground-traffic controllers and their equipment. A satellite based navigation system is in use by aircraft 10. As is well known, a plurality of satellites 18 transmit respective signals to Earth. By receiving a plurality of these signals, and detecting the timing and content of these signals, equipment on board aircraft 10 can calculate the position of the aircraft in three dimensions. The satellite navigation system may employ one or more "pseudolites" 20. Such pseudolites are ground based transmitters which mimic the transmissions of the satellites 18. They are particularly useful, for example, at low level within mountainous terrain, where there may be insufficient line-of-sight view of the satellites 18. The satellite navigation system aboard aircraft 10 receives the signals from the pseudolite 20 and processes them as if they were signals from a satellite 18.

The ground based augmentation system (GBAS) in use at airport 14 employs a number of reference receivers 22 on or near the airport 14. The GBAS also comprises a GBAS processing facility 24, which receives information from the reference receivers 22 and provides information to the control tower 16 and to a VHF data link transceiver 26.

The reference receivers 22 receive the signals from the satellites 18 and any pseudolites 20. This enables the receivers to apply standard satellite navigation interpretation techniques to calculate their own apparent position. Since the reference receivers 22 are obviously geo-stationary, each one can be accurately programmed with its actual location, and can compare this location with the location calculated from the satellite navigation data it receives. These calculations may be performed at the respective reference receiver 22, or the raw data may be transferred to the GBAS processing facility 24, where the calculations are then carried out. In certain embodiments, the GBAS processing facility may be located within the control tower 16, or within one or more of the reference receivers 22.

The calculations for each reference receiver 22 will yield an error value, that is, a representation of the three-dimensional difference between the position of the reference receiver as calculated from the satellite navigation data, and the three-dimensional position stored in or for that reference receiver.

Using these error values, the GBAS generates a periodic signal 28 from the VHF data link transceiver 22 to the aircraft 10, assisting the aircraft's on-board navigation equipment to calculate a more accurate position for the aircraft, thereby to assist the pilot in performing a blind landing, that is, one in which the pilot does not have a view of the runway 12.

In practice, a signal monitor, not shown in FIG. 1, will be arranged also to receive the signal 28 from the VHF data link transceiver 26. This enables the GBAS processing facility 24 and the control tower 16 to ensure that the signal 28 is available for use.

A full function GBAS will allow so-called Category III landings to be made with satellite navigation, i.e. it replaces the current Instrument Landing Systems (ILS) for "blind landings".

One of the main differences between the ILS and the GBAS is the ubiquity of the latter on and around the airport. ILS works by sending narrow radio frequency beams off airport in defined directions; they guide in the aeroplanes. GBAS in contrast, uses a VHF data link 26 to send integrity information and corrections for use by satellite navigation receivers in radio line-of-sight. Aircraft 10 equipped and certified to use these augmentations need not make the long straight beam-following approaches of ILS; they could, for example, come in on curved paths alternately from either side of the extended runway centre line. This would increase safety by reducing the time for which aircraft are relatively close together.

Typical safety regulations do not permit anything to be placed adjacent to the runway that is not also an "aid to air navigation". Although 'low profile' items are allowed next to taxiways, the present invention seeks a solution for the whole of the movement area.

The present invention accordingly provides that a GBAS intended for use in "blind landing" of aircraft as a high integrity source of navigation data is used to provide high integrity navigation data to autonomous vehicles based on the airport. The high-integrity navigation data received by the autonomous vehicle is then compared with pre-defined, or operator defined, areas of permitted operation within the vehicle's guidance system. The present invention can also be used with an alternative high integrity navigation service, for example, another augmentation system such as the space-based EGNOS. Such embodiments may, however, provide less precision in position data.

The basic requirement is to constrain an autonomous vehicle to operate within a particular area for a specific purpose. This requires a particular permitted area to be defined for each vehicle, and also requires means for the vehicle to be aware of its position To take advantage of the high integrity navigation service such as GBAS or EGNOS, the vehicle needs to be equipped with a suitable receiver, which typically comprises a navigation receiver, a data receiver and a navigation processor that estimates the position based upon the measurements made and the supplementary data received.

An autonomous vehicle operated in accordance with the present invention will accordingly be aware of its present position, and whether such position lies within its permitted area. The vehicle will need to be programmed with a required operation in the case that the vehicle finds itself outside of its permitted area. This could happen for example as a result of the reprogramming of the permitted area while the vehicle is in operation, or as a result of the vehicle being incorrectly deployed after being removed for servicing. The vehicle could, for example, be instructed to calculate a route back to the permitted area, in which case the vehicle will need to be provided with information on any obstacles to its path. This may be achieved for example by providing the vehicle with sensors such as touch sensitive fenders or a video camera. Alternatively, the vehicle may be programmed to merely remain stationary, possibly sending an alarm signal to the control tower 16. In another example, the vehicle could be programmed to proceed to a predefined muster station, which should be located well away from any aircraft operational area. This may provide particular advantage for example in the case of an incoming aircraft which has announced its intention to make an emergency landing. By reprogramming the permitted region of operation of each autonomous vehicle to include only its muster station, all vehicles could be sent to a muster station, well out of the way of the incoming aircraft. Such reprogramming should preferably be effected by a single command in the control tower 16. Alternatively, a similar effect could be provided by an "override" signal emitted from the control tower. This would instruct the vehicles to proceed to the muster station, but would not remove the previously stored data defining each vehicle's permitted area.

In normal operation, when the autonomous vehicle is within its permitted area, and is aware of its current position, then its operation strategy will be defined according to the intended purpose of the autonomous vehicle. For example a vehicle for sensing debris and foreign objects on the runway would patrol up and down the length of the runway, but offset from the edge. An autonomous grass cutter may also go up and down, but it may alternatively spiral in to, or out from, to the centre of its permitted area. Such operation may, for example, be implemented as a rule-based system that tailors the required operational strategy to current constraints, to provide a plan of operations for the vehicle. Alternatively, it may apply the constraints 'on the fly'. In either case the vehicle requires to have a path management system or equivalent that directs its motion by providing instructions to the traction control based upon position estimates from a navigation processor, the strategy and the constraints.

The definition of the permitted area for each autonomous vehicle can be achieved in a number of ways, depending on application and what type of equipment is already available to the user. It could, for example, be predefined by the operating authority, typically the control tower 16, and down-loaded to the vehicle by direct or wireless means.

Alternatively, it could be entered manually to the vehicle, via a keyboard or similar device. The vehicle could alternatively be taught by being physically taken to the place and shown the boundary. The vehicle would be aware of its own position, and so would be able to calculate the boundary definition for itself. This could either be by taking the vehicle along the edges of the permitted area, or just to the points that define the corners. In the latter case, unless the area is a triangle, the vehicle also requires to know which of the corners are connected directly to each other via edges of the permitted area. Well-surveyed areas lend themselves to remote definition methods, whereas 'arbitrary' deployments would be easier with the teaching method.

The permitted operating area for a vehicle does not have to have a single boundary, e.g. it can have holes in it. For example, a grass-cutting vehicle can be programmed to avoid the runway lighting assemblies. It could also be a track, i.e. the vehicle is constrained to operate along a defined path rather than within a defined area. The permitted area may also be defined to have a guard band i.e. a strip of land around the operating area. If the vehicle should enter the guard band it must immediately return to its operating area.

A number of user-friendly means of entering polygonal shape information into computing systems are known, for example, by using a pointing device to draw a representation of the required area onto a map representing the airport displayed on a screen or printed onto a tablet. These techniques are used for example in air traffic control systems to define restricted airspace. A ground movement control system on an airport could be extended to manage the autonomous vehicles and used to define their constraint areas.

Figure 2:
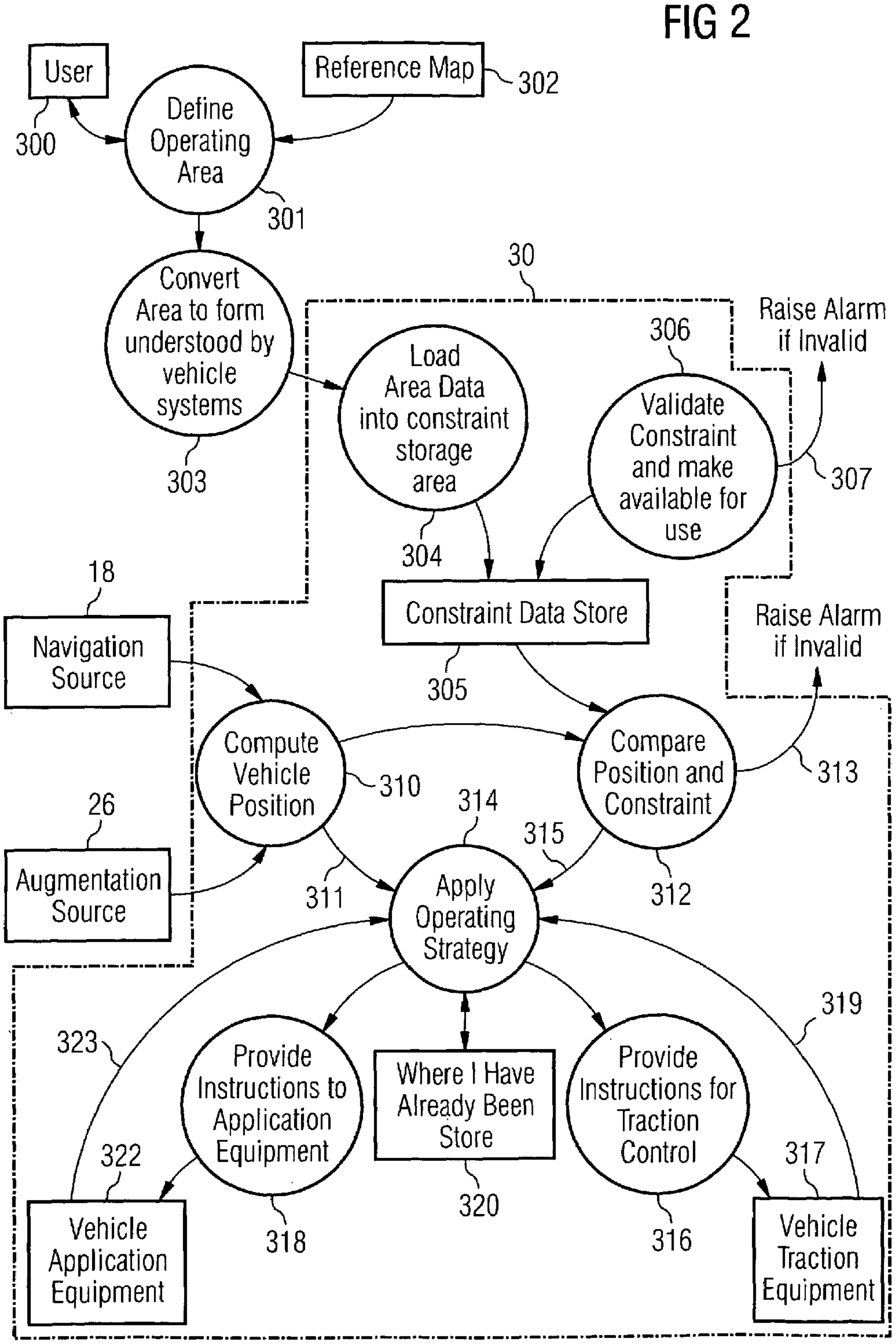
FIG. 2 shows a flow diagram of a method of controlling an autonomous vehicle according to an aspect of the present invention.

FIG. 2 represents a flow diagram of a typical autonomous vehicle operation process according to the present invention. The process illustrated in FIG. 2 is a general purpose process and will underlie any specific operation required of the vehicle in carrying out its allotted function, for example, debris detection or grass cutting.

In FIG. 2, the rectangles represent the 'actors': people or machines external to the vehicle that interact with the vehicle, while circles represent processes: how information is changed in the system. Directed lines represent flows of information between processes and/or actors. The arrow on each line indicates where the net flow of information is going; it does not imply that there is necessarily no acknowledgement or other protocol. A line with an arrow on each end represents a dialogue of information. The dotted line 30 defines a sub-set of the processes that may be carried on each vehicle. This is not a firm boundary. Some, or all, of the area defining processes may also be included on the vehicle at the discretion of the implementer. The constraint validation, for example, may alternatively be performed off-vehicle.

A user 300, such as a ground traffic controller, or a vehicle supplier, or vehicle maintenance technician, defines 301 an operating area for an autonomous vehicle, by reference to a reference map 302. The reference map may be embodied on a computer display screen, and the act of defining the operating area may comprise drawing the operating area, or at least its corners, on the screen. Alternatively, the reference map may be the airport itself in conjunction with the navigation systems discussed, and the act of defining the area may include the step of physically taking the vehicle around the boundary of its operational area.

The definition of the operating area must then be converted 303 into a format which is understood by the vehicle systems. This may comprise, for example, conversion of the area drawn on the screen into a set of co-ordinates for communication to the vehicle, or the interpretation of navigation data received by the vehicle at the locations which the vehicle is taken to as it is taken around the boundary of its operating area. The process of step 303 may accordingly be performed within the boundary 30 of the autonomous vehicle, or externally. The converted data representing the permitted area is then loaded 304 into a memory, which may be referred to as the constraint storage area. This task may be undertaken entirely within the boundary 30 of the autonomous vehicle, or on the periphery, with the storage device 305 lying within the vehicle boundary 30 but the access and writing equipment remaining at least partially external. Various validation routines 306 may be employed, to check the validity of the data stored in the constraint data store 305, representing the permitted area of operation of the vehicle. If the validation routine indicates erroneous constraint data, it signals 307 an alarm condition. This may cause the area constraint data to be reloaded into the store 305, or may prompt the user 300 to check the area settings chosen.

The vehicle receives position information data both from the satellite navigation system 18 and the augmentation source 26, each illustrated in FIG. 1. The data sent by these navigation systems is collected within the vehicle 30, enabling the vehicle to accurately compute 310 its present position. With the present position accurately known, a compare function 312 compares the calculated present position to the data in the constraint data store, indicating the permitted area for the vehicle. If the comparison reveals that the vehicle is outside of its allowed area, an alarm signal 313 may be activated, to indicate to the user 300, and/or a ground- or air-traffic controller that the vehicle is outside of its permitted area. The vehicle may then be controlled by the user and/or the ground- or air-traffic controller to take appropriate action—for example, to proceed directly to its permitted area, to proceed to a predefined muster station area, to remain stationary, or to enter a remote control mode, whereby the user 300, or the ground- or air-traffic controller or another person, such as ground safety crew, may remotely control the vehicle and return it to a safe location, or to a service bay, for example. The ground- or air-traffic controller may take a decision to, or may be required by procedure to, suspend aircraft movements on land while such operations take place.

The vehicle may also be equipped to detect a failure to receive a signal from the augmentation source 26. The signal from the augmentation source is typically an intermittent signal, transmitted at a regular interval. The vehicle may operate to measure the time elapsed since receipt of the last signal from the augmentation source. If this measured time exceeds a certain threshold, the vehicle recognises this as a lost signal, and may be arranged to react in a similar manner to that discussed above in relation to the vehicle being outside its permitted area.

The vehicle 30 will have an operating strategy 314, which may be pre-programmed into the vehicle, or may be remotely downloaded. The operating strategy 314 will define how the vehicle is to respond to various sets of parameters. As a minimum, the operating strategy 314 will receive a signal 311 from the compute vehicle position process 310, to indicate the present position of the vehicle, and a signal 315 from the compare process 312, to indicate whether the present position is within the permitted area.

The operating strategy 314 will prompt the actions of the traction control 316 and the applications equipment control 318. For example, if the "compare position and constraint" process 312 indicates that the vehicle is outside its permitted area, then the operating strategy will control the vehicle according to a predefined strategy for this situation—typically, either to proceed directly to a muster station, or to attempt to return to the permitted area, preferably also sending an alarm to the user 300 to indicate that it is out of its permitted area. Such instructions will be interpreted according to the current position of the vehicle, supplied by data 311 from the compute vehicle position process 310. The operating strategy 314 will send instructions to the traction control process 316 defining the speed and direction that the vehicle should adopt. The traction controller will then instruct the vehicle traction equipment 317, for example electrically powered wheels or caterpillar tracks, to cause the vehicle to move in the determined direction at the required speed. A feedback path 319 may be provided for the traction equipment to provide information to the operating strategy according to the operation of the traction equipment. For example, if one of the wheels is stuck, or slipping on mud or ice, the operating strategy 314 becomes aware of the problem, and adapts the operating strategy to overcome the problem according to predetermined reaction control sequences.

On the other hand, assuming that the vehicle is within the permitted operating area, the operating strategy will instruct the traction control process 316 to cause the vehicle to continue along the required path to perform its allotted function. For example, a runway debris monitoring vehicle would be instructed to continue to patrol the edges of the runway to search for debris left on the runway. On the other hand, a grass cutting vehicle would operate according to a predetermined pattern. For example, the vehicle could proceed in a back-and-forth pattern, cutting grass in stripes. Alternatively, the vehicle could spiral in to, or out from, the centre of a region of grass to be cut. The operating strategy 314 will be aware of the vehicle's current position, and whether that position is within the permitted area for the vehicle. Using that information, the operating strategy will calculate the direction and speed that the vehicle next needs to take, and the operating strategy will instruct the traction controller 316 accordingly. The traction controller 316 will interpret these instructions and provide appropriate control to the traction equipment, such as electrically powered wheels.

The vehicle 30 may be provided with a memory 320 for storing the locations that it has recently been to. Labelled the "where I have already been store", this memory will serve as a reference to aid the operating strategy 314 in calculating the required future trajectory for the vehicle. The operating strategy 314 will also determine the appropriate operational function of the vehicle. Using a simple example, this could be "cutters up or cutters down?" for a grass cutting vehicle. For a runway debris detection vehicle, the control may be rather more complex, requiring detection and evaluation control, communications and even control of a mechanical debris retrieval mechanism. The required operation of the operational equipment is determined by the operating strategy 314 and sent to the application equipment controller 318, which will provide the direct control to the vehicle application equipment 322, for example, to activate or de-activate cutters, to pan or zoom an attached camera and so on. A feedback path 323 may be provided, to pass information on the state of the application equipment back to the operating strategy 314. Output from data sources such as a camera carried on the vehicle, or internal status records, would need to be transmitted back to the user 300, but such control and data paths are not shown in FIG. 2.

Figure 3:
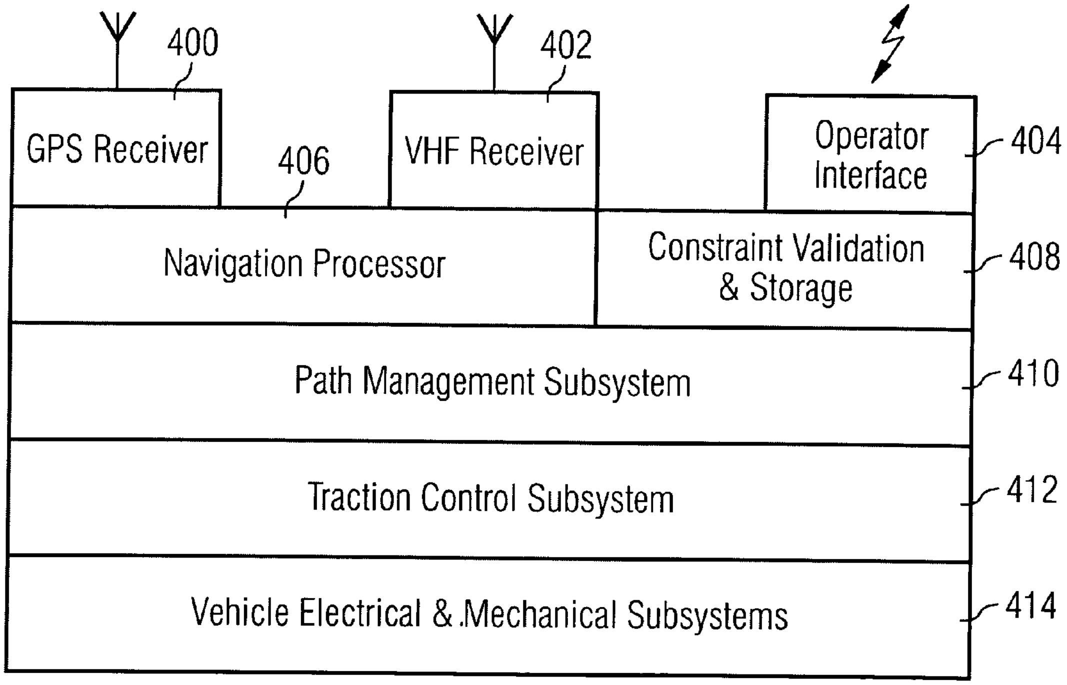
FIG. 3 shows a functional block diagram of various subsystems within a vehicle according to an aspect of the present invention.

FIG. 3 shows a functional block diagram of the various subsystems within a vehicle according to the present invention. The application equipment has not been shown in FIG. 3 as it is incidental to the method described herein. A GPS receiver 400 receives satellite navigation signals from navigation satellites 18. A VHF receiver 402 receives augmentation system navigation information from the augmentation system 26. An operator interface 404 provides communication with an operator. Such communication is preferably wireless, and is preferably bi-directional. Navigation data from the GPS receiver 400 and the VHF receiver 402 are supplied to a navigation processor 406 which interprets the supplied data and accurately calculates the position of the vehicle, performing process 310 of FIG. 2. A constraint validation and storage system 408 receives information from operator interface 404 regarding the permitted area, and stores it in the vehicle, performing operations 304–306 of FIG. 2. Path management subsystem 410 receives information on the permitted area, the present position and the operating strategy, in order to control traction control subsystem 412. Path management subsystem 410 will perform processes 312, 314, of FIG. 2. Traction control subsystem 412 corresponds to process 316 of FIG. 2, and provides direct control of the vehicle's motion, by wheels or caterpillar tracks, for example. Finally, the vehicle electrical and mechanical subsystems 414 provide direct control of the vehicle's operating equipment, and corresponds to equipment 317, 322 of FIG. 2.

Although the term vehicle has been used in this description, the principles clearly apply to any roving equipment, be it on wheels, tracks, legs or other means of mobility.

It has been observed that the areas near runways are clear of obstructions other than aids to navigation. It should be noted that this is not the case in other areas, e.g. near the edge of a taxiway there may be low fences. There may also be small pits containing, e.g. power distribution equipment. The vehicle must avoid all these hazards, but this need not necessarily be by use of the constraint areas described; the vehicle may also carry diverse means of obstacle avoidance, for example a vision system as described in UK patent GB 2218507 or GB 2246261. Vehicles may also operate in concert with others as described in UK patent GB 2231220 for example, scanning for debris from both sides or a runway at once to improve detection probabilities.

It would be advantageous in most cases for there to be a 'global' area in which the vehicle could be required to operate on a particular occasion being defined using the foregoing process. In the simplest case the 'global' area could be made up of a mosaic of smaller areas, not necessarily connected, and one of these 'tiles' is selected for the current operation. Selection could be for example by placing the vehicle within the desired tile and, on initialisation, it would automatically recognise in which tile it is located, and start appropriate operations.

What is claimed is:

1. A method for operating an autonomous vehicle at an airport, comprising the steps of:

(a) providing (18) a first set of navigation signals for general purpose use;

(b) providing (26) a second set of navigation signals (28), being supplementary to the first navigation signals, for guiding aircraft to land at the airport;

(c) receiving (400), in the vehicle, the first set of navigation signals;

(d) receiving (402), in the vehicle, the second set of navigation signals;

(e) receiving (304; 404) constraint data representing a permitted area of operation;

(f) calculating (406,310) a present position of the vehicle;

(g) comparing (312) the calculated present position of the vehicle with the constraint data, thereby to determine whether the vehicle's present position lies within the permitted area; and (h) producing a signal (313; 315) indicative of the result of said comparing step; and (i) operating the vehicle in accordance with a predefined strategy (314) in response to the status of the signal (313; 315) of step (h).

2. A method according to claim 1 wherein the steps (f), (g) and (h) are also performed within the vehicle.

3. A method according to claim 1, wherein the first set of navigation signals comprises signals emitted by a satellite navigation system (18).

4. A method according to claim 1, wherein the second set of navigation signals comprises signals emitted by an augmentation system (26) for navigation for commercial air transport.

5. A method according to claim 4 wherein the second set of navigation signals comprises signals sent by a ground-based augmentation system (GBAS).

6. A method according to claim 4 wherein the second set of navigation signals comprises a set of signals issued at a fixed period, and wherein the vehicle monitors the arrival of these periodic signals and emits an alarm signal if the periodic signal is not received within a predetermined delay.

7. A method according to claim 6 wherein, in response to the alarm signal, the vehicle proceeds to a predetermined muster station, which may be the current location of that vehicle.

8. A method according to claim 1, wherein, in response to the comparing step indicating that the vehicle lies outside of the permitted area, generating an alarm (313) to an operator (300).

9. A method according to claim 8 further comprising the step of enabling the operator (300) to remotely control the vehicle, thereby moving the vehicle into its permitted area.

10. A method according to claim 1, wherein, in response to the comparing step indicating that the vehicle lies outside the permitted area, automatically calculating a route from the vehicle's present position to the permitted area; and controlling the vehicle to proceed to the permitted area.

11. A method according to claim 1, wherein, in response to the comparing step indicating that the vehicle lies outside of the permitted area, controlling the vehicle to proceed to a predetermined station.

12. A method according to claim 1, further comprising the step of issuing a muster signal to the vehicle, receiving said muster signal in the vehicle, and controlling the vehicle to proceed to a muster station.

13. A method according to claim 12 wherein the muster signal comprises signal redefining the permitted area to include only the muster station.

14. An autonomous vehicle for use at an airport, comprising:

electrical and mechanical subsystems (414) to enable the vehicle to move and to perform an allotted function;

a traction control subsystem (412) for controlling the electrical and mechanical subsystems to operate the vehicle in a required manner;

a path management system (410) for calculating a required path for the motion of the vehicle to follow;

a navigation processor (406) for calculating a present position of the vehicle;

a constraint store for storing constraint data indicating a permitted area of operation;

a comparator for comparing the constraint data with the present position;

a first navigation receiver (400) for receiving a first set of navigation signals, being general purpose navigation signals;

an operator interface (404) for communicating with an operator; and a second navigation receiver (402) for receiving a second set of navigation signals, being supplementary to the first navigation signals, for guiding aircraft to land at the airport.

* * * * *